United States Patent
Tsuruta et al.

[11] 3,941,875
[45] Mar. 2, 1976

[54] PROCESS FOR TREATING GAS CONTAINING HYDROGEN SULFIDE

[75] Inventors: Hidemasa Tsuruta; Yukinori Hiwatashi; Teruhiko Hirabayashi, all of Tokyo; Seiji Kumata, Fuchu, all of Japan

[73] Assignee: Nittetu Chemical Engineering Ltd., Tokyo, Japan

[22] Filed: Apr. 26, 1973

[21] Appl. No.: 354,868

[30] Foreign Application Priority Data
Apr. 26, 1972 Japan.................... 47-41259

[52] U.S. Cl. ............. 423/571; 423/232; 423/428; 423/514; 423/512 R; 423/551; 423/560; 423/563; 423/566
[51] Int. Cl.² ................ C01B 17/06; B01D 53/34
[58] Field of Search .......... 423/224, 428, 232, 573, 423/233, 563, 514, 566, 427, 521, 519, 571, 366, 354, 355, 512, 551, 560

[56] References Cited
UNITED STATES PATENTS

| | | | |
|---|---|---|---|
| 1,542,971 | 6/1925 | Sperr, Jr. et al. ............ | 423/232 |
| 1,653,933 | 12/1927 | Sperr et al. ............ | 423/232 |
| 3,086,838 | 4/1963 | Giammarco ............ | 423/223 |

FOREIGN PATENTS OR APPLICATIONS

| | | | |
|---|---|---|---|
| 17,302 | 1/1930 | Australia............ | 423/366 |

OTHER PUBLICATIONS
Horntvedt, "A Sodium-Base Sulfite Recovery Process Based on Pyrolysis", Journal of the Technical Association of the Pulp & Paper Ind., Vol. 53, No. 11, Nov. 1970 pp. 2147–2152.

Primary Examiner—Earl C. Thomas
Attorney, Agent, or Firm—Lane, Aitken, Dunner & Ziems

[57] ABSTRACT

A process for treating a hydrogen sulfide-containing gas in a closed loop system wherein said gas is passed through and absorbed by an alkaline aqueous absorbent containing an alkali carbonate and an oxidation catalyst. The solution containing the dissolved hydrogen sulfide is oxidized with an oxygen-containing gas to convert the absorbed hydrogen sulfide into elementary sulfur and sulfur salt compounds. After separation of the elementary sulfur from the solution, the solution is re-circulated for use as alkaline absorbent. A part of the re-circulated solution is diverted and subjected to mixed-combustion with an auxiliary fuel in a combustion furnace at an air ratio lower than 0.9 and at a temperature of 700°C to 1100°C to thermally decompose the sulfur compounds into hydrogen sulfide and an alkali carbonate. The gaseous products of decomposition are brought into direct contact with boiling water to collect the alkali carbonate in the form of an aqueous solution and leaving hydrogen sulfide in the gas.

4 Claims, 1 Drawing Figure

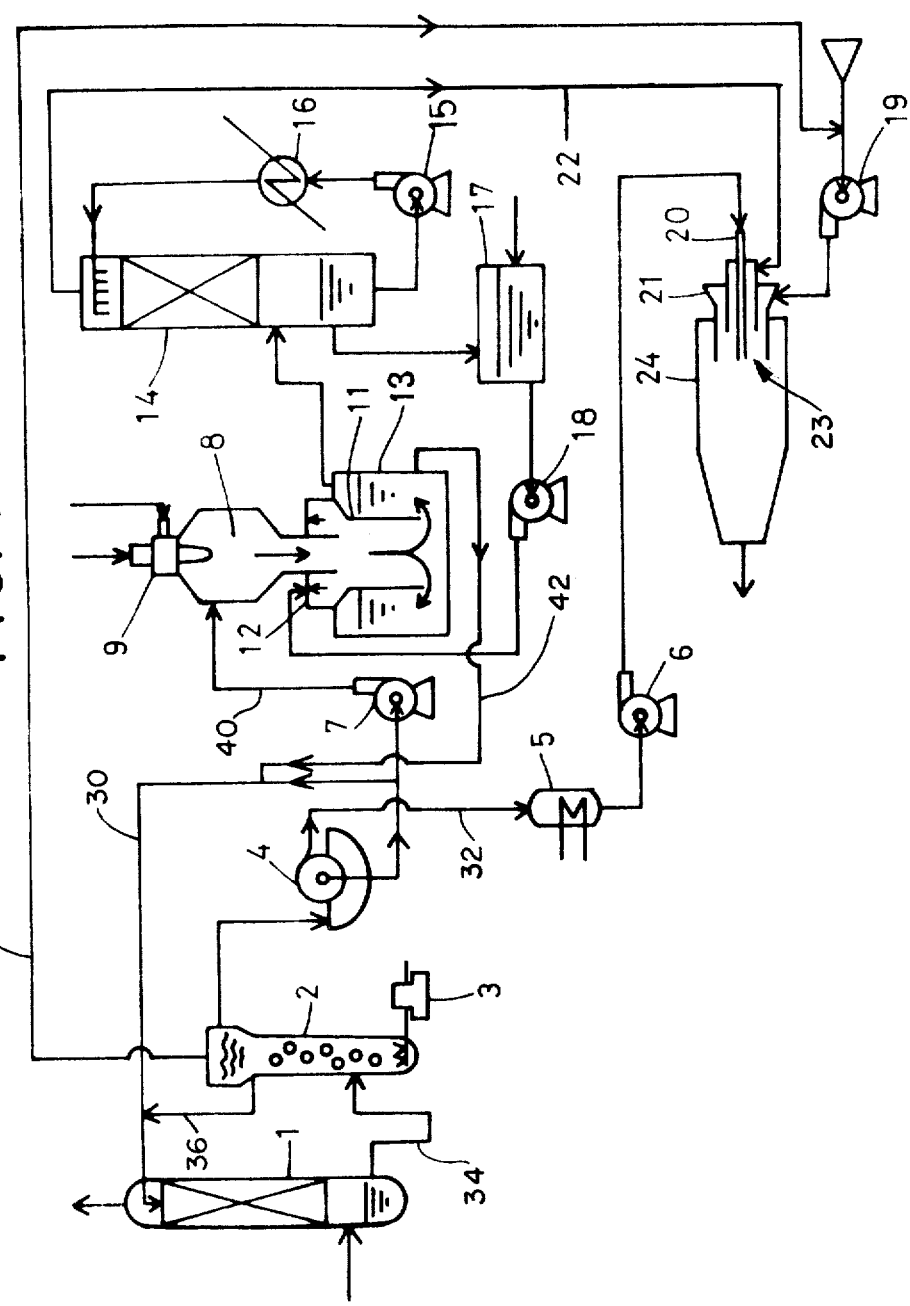
FIG. I

PROCESS FOR TREATING GAS CONTAINING HYDROGEN SULFIDE

BACKGROUND OF THE INVENTION

This invention relates to a process for removing hydrogen sulfide from a gas stream.

Several processes for treating a hydrogen sulfide-containing gas are known in the art. Conventional processes generally involve the steps of contacting a hydrogen sulfide-containing gas with an aqueous solution, which contains an alkali carbonate and an oxidation catalyst, for selective absorption of hydrogen sulfide, and oxidizing the solution containing the absorbed sulfide with an oxygen-containing gas to convert the absorbed hydrogen sulfide to elementary sulfur.

Such conventional processes offer several economic advantages in that the absorption of hydrogen sulfide by the aqueous solution is extremely efficient and the oxidation reaction can be conducted at ambient temperatures under atmospheric pressure using air as the oxidizer. Accordingly, these processes have been widely applied to desulfurization of coke oven gas in the manufacture of city gas and in the steel industry. However, the prior art processes have a drawback that when oxidized in oxidation apparatus by catalytic action, the hydrogen sulfide absorbed in the alkali aqueous solution is excessively oxidized to produce sulfur oxides together with elementary sulfur as shown in the following reaction formulae which show sodium carbonate used as the alkali carbonate:

Absorption stage $H_2S + Na_2CO_3 \rightarrow NaHS + NaHCO_3$ (1)

Oxidation stage $NaHS + \frac{1}{2}O_2 \rightarrow NaOH + S$ (2)

$NaHS + O_2 \rightarrow Na_2S_2O_3$ (3)

$\rightarrow Na_2SO_3$ $\rightarrow Na_2SO_4$

Recovery stage $NaOH + NaHCO_3 \rightarrow Na_2CO_3 + H_2O$ (4)

As indicated by formula (3), a part of the hydrosulfide is converted into a mixture of sodium thiosulfate, sodium sulfite and sodium sulfate in the oxidation step. The sodium bicarbonate which has been produced according to formula (1) in the absorption stage directly reacts, according to formula (4), with the caustic soda which has been produced according to formula (2) in the oxidation step, so that the resultant solution contains sufficient sodium carbonate so that it may be re-used by feeding it back to the absorption stage.

The sulfur salts or compounds produced according to reaction (3) in the oxidation step do not precipitate due to their high solubility in water and accumulate in the dissolved state in the aqueous solution. Consequently, when the aqueous solution containing sodium carbonate is recirculated to the absorption stage, the sulfur-containing salts or compounds adversely affect the absorption of hydrogen sulfide by the aqueous solution. Accordingly, it is necessary in the prior art processes to divert from the system as a waste a part of the aqueous solution which is circulated between the absorber and the oxidizer, so that the total concentration of the sulfur compounds dissolved in the carbonate-containing aqueous solution can be maintained below a predetermined value. In such prior art processes, it is also required to add the alkali component, e.g., in the form of caustic soda or sodium carbonate, to the absorbent liquid in an amount corresponding to that removed from the system in the waste stream. These features are disadvantageous from both the operational and economic viewpoints.

Moreover, where hydrogen cyanide as well as hydrogen sulfide are present in the gas being treated, e.g. a coke oven gas, the solution leaving the scrubber contains cyanide together with hydrosulfide which are converted into a thiocyanate at the oxidation step as shown in the following formula:

$NaHS + NaCN + \frac{1}{2}O_2 \rightarrow NaSCN + NaOH$ (5)

The thiocyante is very soluble in water, so that sodium thiocyante is accumulated in the recirculated aqueous solution. As a result, an even greater amount of the aqueous solution is required to be removed from the system as a waste liquor where cyanides are present. This, in turn, requires addition of even greater amounts of the alkali component to replace alkali values lost in the waste stream. The waste liquor also contributes to the pollution of nereby rivers and seas if disposed without additional treatment. Accordingly, it is necessary to render the waste liquor harmless by neutralization or by a suitable method which involves additional costs.

SUMMARY OF THE INVENTION

The present invention provides a process for treating a hydrogen sulfide-containing gas in a closed loop system, wherein the gas is first passed through an alkaline aqueous solution containing an alkali carbonate and an oxidation catalyst thereby to dissolve hydrogen sulfide and to form a first salt solution containing hydrosulfides and bicarbonates. The hydrogen sulfide-containing first salt solution is then subjected to oxidation with an oxygen-containing gas by conventional means to convert the hydrogen sulfide dissolved in the solution into elementary sulfur and sulfur compounds in the form of salts other than sulfide. The sulfur thus produced is separated and removed from the solution and the residual or second salt solution is recirculated for use as an absorbent. The improvement involves the steps of: removing a portion of the solution from the circulating stream; roasting that portion of the residual solution by mixed-combustion with an auxiliary fuel in a combustion furnace at an air ratio less than 0.9 and at a temperature of 700°C to 1100°C to thermally decompose the sulfur compounds contained therein into hydrogen sulfide and an alkali carbonate; and bringing the resultant combustion products into direct contact with hot water to dissolve the alkali carbonate to form a third salt solution. The hydrogen sulfide remaining after combustion is recovered for industrial use or converted to other products.

The present invention is based upon the fact that when the combustion products containing hydrogen sulfide and an alkali carbonate are brought into direct contact with boiling water, the alkali carbonate readily dissolves but the hydrogen sulfide is only slightly soluble in boiling water. In addition, even when the gas to be treated contains hydrogen cyanide in addition to hydrogen sulfide, e.g. as in a coke oven gas, the gas can be economically treated by the process of the present invention.

According to the process of the present invention, sulfur-containing salts, i.e., sulfate, sulfite, thiosulfate, and thiocyanate, accumulated in the alkaline aqueous solution are subjected to combustion in admixture with an auxiliary fuel such as propane gas, coke oven gas or other liquid fuel under the predetermined burning conditions mentioned above. The combustion is effected by spraying the salt-containing solution to mix it with a high temperature combustion gas emanating from a burner. Generally, the salt solution fed to the combustion chamber contains water in amounts as high as 50 to 80% by weight and the dissolved solids have low calorie values; therefore, the salt solution is not self-combustible. Where the air ratio is higher than 0.9 or the burning temperature is lower than 700°C, the thiocyanate, sulfate and sulfite salts contained in the alkaline aqueous solution do not sufficiently decompose. On the other hand, when the combustion temperature is higher than 1100°C, a larger amount of an alkali sulfate is produced at the expense of the amount produced of the desired alkali carbonate. Experiments reveal that thermal decomposition is preferably achieved at an air ratio of 0.6 to 0.7 and at a temperature of 800°C to 850°C. Additionally, the residence time within the combustion chamber is preferably at least 0.5 seconds. In practice, it is preferable that the air ratio be lowered with a rise in the gas combustion temperature and, conversely, the air ratio be raised with reduced gas combustion temperatures within the ranges mentioned above. The combustion decomposition described above is conducted on the whole in a reducing atmosphere.

In the present invention, the direct contact of the combustion gas with boiling water is effected by passing the combustion products through a water bath. Sodium carbonate which is contained in the combustion products will dissolve in boiling water, while hydrogen sulfide will not.

It is therefore an object of the invention to provide a process for treating a hydrogen sulfide-containing gas which overcomes disadvantages of the prior art processes.

It is another object of the invention to provide a process for removing hydrogen sulfide from a gas by absorption with an aqueous solution which contains an alkali carbonate and an oxidation catalyst, wherein the aqueous solution containing the absorbed hydrogen sulfide is subjected to thermal decomposition in which the production of an alkali sulfate is suppressed.

It is yet another object of the invention to provide a process for treating a gas containing both hydrogen sulfide and hydrogen cyanide, wherein the problems created by the presence of hydrogen cyanide in the prior art processes are satisfactorily avoided.

Other objects and further scope of applicability of the present invention will become apparent from the detailed description to follow, taken in conjunction with the accompanying drawing.

BRIEF DESCRIPTION OF THE DRAWINGS

The sole FIGURE is a flow chart illustrating one embodiment of the present invention wherein an alkaline aqueous solution containing sodium carbonate is used for removing hydrogen sulfide and hydrogen cyanide from a coke oven gas.

DESCRIPTION OF THE PREFERRED EMBODIMENTS

In the following, the process is described as applied to a coke oven gas (which will be hereinafter referred to as COG for brevity) containing hydrogen sulfide, but it should be noted that the present invention is not limited to the treatment of COG.

COG is fed into a lower section of an absorption tower 1 and an absorbent liquid containing sodium carbonate is introduced into an upper section of tower 1 through line 30. In this manner, the COG is scrubbed with the absorbent liquid in a countercurrent flow relationship. In general, 1 m$^3$ of COG contains 5 – 6g of H$_2$S and about 2g of HCN and a significant amount of CO$_2$ as an acidic gas. It is possible to raise the absorption rate of the hydrogen sulfide and hydrogen cyanide to substantially 100% and to minimize the absorption rate of CO$_2$ by properly selecting: the ratio of sodium carbonate to sodium bicarbonate in the absorbent liquid and the concentration of these two compounds; the ratio for the amount of COG gas feed to the amount of Na$_2$CO$_3$ containing absorbent liquid; and the ratio of the amount of oxidation catalyst to the amount of oxygen in the liquid. The liquid containing the absorbed gas passes from the lower section of absorption tower 1 through line 34 to an oxidation tower 2, wherein it is oxidized by bubbled air which is injected into the liquid by means of an air compressor 3. The absorbed hydrogen sulfide is converted into elementary sulfur in the oxidation tower 2 according to the reaction shown by formula (2). A portion of liquid which contains the precipitated sulfur is removed from the top portion of the tower 2 and is introduced into a filter 4 to separate the sulfur from the liquid. The filtrate is returned to line 30 for re-use as an absorbent and the separated sulfur is collected. The liquid which has been treated in the oxidation tower 2 is returned through line 36 and circulating line 30 to the top of the absorption tower 2. The liquid exiting through line 36 has a reduced concentration of sodium hydrosulfide and a high concentration of sodium carbonate, as a result of the reactions represented by formulae (2) and (3), thus the absorptivity of the liquid is restored. The gas exits from the oxidation tower 2 through line 38. The reactions according to formulae (4) and (5) occur simultaneously with (2) and (3) to produce sulfur oxide-containing salts and thiocyanates. Since the concentrations of these salts would increase in the absorbent liquor with time, a waste liquor delivery pump 7 is provided to divert a portion of the absorbent liquor and to maintain the concentration of such by-product salts below a predetermined value. The portion of the circulating absorbent liquid which is removed from the system via line 40 by means of the pump 7 is sprayed into a combustion furnace 8 as is, or after being condensed by a suitable condenser (not shown). Since the water content of the waste liquor is as much as 50 – 80% by weight and the solid components of the waste liquor are not self-combustible, an auxiliary fuel burner 9 is provided in the furnace. The burner 9 burns COG or other fuels in a reduction atmosphere having an air ratio less than 0.9. During combustion, water in the waste liquor is evaporated and solid components are thermally decomposed. Thus, the decomposition by mixed-combustion is conducted, on the whole, in a reducing atmosphere. The mixed-combustion decomposition is carried out on the whole at an air ratio below 0.9 and at a temperature of from 700°C to 1100°C. Preferred results can be obtained by using a residence time for the gases within the furnace 8 of longer than 0.5 seconds, a temperature of 800°C to 850°C and an air ratio ranging from 0.6 to 0.7. Under these conditions, most of the organic substances are gasified and the greater part of the sulfur-containing salts, cyanide and thiocyanate, are thermally decomposed to sodium carbonate and hydrogen sulfide.

The decomposition products mixed with the combustion gas pass through the bottom of the furnace 8 to a quenching chamber 12 where they are rapidly cooled by contact with water supplied by pump 18. Then, the combustion products pass through a downcomer tube 11 in a mixed phase flow into the liquid which fills a soda recovery tank 13. The mixed phase flow reaches almost complete thermal and physical equilibria while passing through the liquid in tank 13. The boiling water in recovery tank 13 dissolves the sodium carbonate which has been produced in the preceding thermal decomposition within furnace 8. The liquid in tank 13 also dissolves a small amount of carbon dioxide, thereby causing the sodium carbonate to be converted into sodium bicarbonate. At this stage, hydrogen sulfide present in the mixed gas is only slightly soluble in the liquid within tank 13 and, therefore, passes through, remaining in the gaseous state. The liquid containing sodium carbonate and sodium bicarbonate is routed via line 42 for use as an absorbent in tower 1.

The temperature of the free gas exiting tank 13 is substantially the same as that of the liquid in the recovery tank 13, the gas being saturated with steam vapor. In order to remove steam vapor from the gas, the gas is cooled by contact with cool water in a condensing tower 14 which is provided with a circulation pump 15 and a condenser 16, thereby condensing the steam vapor to a degree that a partial vapor pressure for water corresponding to the scrubbing water temperature is attained. The condensed water is then transferred to a circulation liquid collection tank 17 for supplementing the feed water to quenching chamber 12 by means of a pump 18.

The waste gas, after removal of water vapor in tower 14, is mixed, if necessary, with an auxiliary fuel to make the gas self-combustible and fed through line 22 to nozzle 20 of combustion burner 23. The waste gas is mixed with air supplied by a blower 19 and burned within chamber 24 to oxidize the hydrogen sulfide to sulfur oxides.

The elementary sulfur which is recovered in the sulfur filter 4 is heated and melted in a sulfur melting tank 5. The molten sulfur is transferred from tank 5 to the mixed combustion burner 23 by means of a pump 6. The mixed combustion burner 23 is hermetically connected to one end of the waste gas combustion furnace 24. Air exhausted from the top of the oxidation tower 2 via 38 is used to burn molten sulfur and waste gas within the combustion furnace 24. The exhaust air from tower 2 is supplemented with fresh air supplied from a secondary blower 19 and fed into the mixed combustion burner 23 through a window box 21. The amount of secondary air is controlled so that the ratio of air to the total combustibles in the waste gas, the auxiliary gas fuel and melted sulfur is maintained at a predetermined constant value. In this connection, it should be noted that where an excess of oxygen is supplied, the sulfur is oxidized to sulfuric acid gas, and where a stoichiometric amount of oxygen is used, sulfur dioxide is obtained. In addition, it is possible to control the burning system in such a manner as to obtain a gaseous mixture of hydrogen sulfide and sulfur dioxide suitable for use in producing free sulfur.

In the foregoing description, the process of the present invention has been described with regard to desulfurization of COG as shown in the flow chart of the drawing. However, the present invention is not limited to the desulfurization of COG, but is applicable to desulfurization of any hydrogen sulfide-containing gases. Moreover, any alkali carbonate such as potassium carbonate may be used in place of the sodium carbonate in the absorbent solution.

The present invention may also be applied to the treatment of a gas which contains hydrogen cyanide together with hydrogen sulfide. In this case also, the accumulation of secondary products in the absorbent liquid can be maintained below a predetermined level without discharging any liquor from the system, i.e., the treatment is conducted in a so-called closed system. Moreover, the alkaline salt used can be recovered almost completely to hold the loss of the salt to substantially nil. A further advantage is that almost the total amount of sulfur contained in the treated gas can be separated and collected in the form of hydrogen sulfide or sulfur.

The condensed hydrogen sulfide may be used as it is, or may be oxidized by burning with air in various ratios to manufacture sulfur dioxide or sulfuric acid (sulfur trioxide) gas.

The present invention is further illustrated by the following example.

EXAMPLE

Desulfurization and decyanization of COG were carried out in a conventional manner using an alkaline absorbent liquid of sodium carbonate to obtain a waste liquor which had the composition shown in Col. (a) below. The waste liquor was condensed under a reduced pressure to give a solution containing 50% by weight dissolved solids. The resultant solution was sprayed into a furnace, shown at 8, wherein COG was used as an auxiliary fuel, and burned in a reducing atmosphere at an air ratio of 0.65. The mixed-combustion products of the sprayed liquor and the COG reached an average temperature of about 800°–820°C. A solution having composition (b), shown below, was obtained in the soda recovery tank 13. The recovery of sodium was more than 97% by weight.

|  | (a) Chemical Composition of Starting Waste Liquor | (b) Chemical Composition of Recovered Soda Solution |
|---|---|---|
| $Na_2CO_3$ | 2.19% by weight | 11.15% by weight |
| $NaHCO_3$ | 2.44 | 6.00 |
| $NaSCN$ | 9.72 | 1.01 |
| $Na_2S_2O_3$ | 5.17 | 0.00 |
| $Na_2SO_4$ | 4.35 | 1.81 |
| $Na_2SO_3$ | 0.02 | 0.71 |
| $NaCN$ | Trace | Trace |
| $NaHS$ | Trace | Trace |

The recovered soda solution contained a small amount of suspended solids such as soot. Accordingly, it was necessary to remove the suspended solids from the solution before use as an absorption medium.

The waste gas exhausted from the soda recovery tank was saturated with steam vapor at 90°C. This gas wwas cooled to 50°C in condensation tower 14 to obtain a waste gas having composition (c), shown below.

| (c) | Chemical Composition of Waste Gas at 50°C |
|---|---|
| $H_2S$ | 8.10% by weight |
| $CO_2$ | 7.56 |
| CO | 0.30 |
| $CH_4$ | 4.75 |
| $H_2$ | 2.50 |
| $H_2O$ | 12.20 |
| $N_2$ + Ar | Balance |

This waste gas had a calorific value of about 1000 Kcal/$NM^3$ and was self-combustible. When this waste gas was burned with a stoichiometric amount of oxygen (controlling the amount of secondary air injected), the resultant combustion product contained about 4% by volume of sulfur dioxide. Thus, the waste gas was suitable for use as a sulfur dioxide producing gas.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process for purifying gas containing hydrogen sulfide in which said gas is washed with an aqueous alkaline solution containing at least one alkali metal carbonate to absorb said hydrogen sulfide to form a first salt solution comprising hydrosulfides, said first salt solution being oxidized to form a second salt solution and to convert at least a portion of said hydrosulfides to free sulfur and at least one sulfur oxide salt selected from sulfates, sulfites and thiosulfates, said free sulfur being removed from said second salt solution; the improvement which comprises:

roasting at least a portion of said second salt solution in a combustion zone formed with an air ratio of less than 0.9 to produce a gaseous combustion product containing hydrogen sulfide and alkali carbonate; and contacting said combustion product with boiling water to selectively absorb said alkali carbonate thereby forming a third salt solution.

2. The process of claim 1 wherein said alkaline solution used in the washing step comprises said third salt solution.

3. The process of claim 1 wherein the temperature within the combustion zone is within the range of 700°C to 1100°C.

4. The process of claim 1 wherein said combustion zone contains an air ratio of from about 0.6 to about 0.7 at a temperature within the range of 800°C to 850°C.

* * * * *